US010268495B2

(12) United States Patent
Chen et al.

(10) Patent No.: US 10,268,495 B2
(45) Date of Patent: Apr. 23, 2019

(54) VIRTUAL DEVICE MODEL SYSTEM

(71) Applicant: Verizon Patent and Licensing Inc., Arlington, VA (US)

(72) Inventors: Zhong Chen, Acton, MA (US); Lin Zhu, Lexington, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 407 days.

(21) Appl. No.: 15/046,991

(22) Filed: Feb. 18, 2016

(65) Prior Publication Data
US 2017/0242714 A1 Aug. 24, 2017

(51) Int. Cl.
| | |
|---|---|
| *G06F 9/54* | (2006.01) |
| *G06F 9/455* | (2018.01) |
| *H04L 12/28* | (2006.01) |
| *H04L 29/08* | (2006.01) |
| *H04L 29/06* | (2006.01) |
| *H04W 4/70* | (2018.01) |
| *H04W 4/02* | (2018.01) |

(52) U.S. Cl.
CPC ............. *G06F 9/455* (2013.01); *G06F 9/541* (2013.01); *B64C 2201/12* (2013.01); *H04L 12/2823* (2013.01); *H04L 63/10* (2013.01); *H04L 67/125* (2013.01); *H04W 4/02* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 8,245,086 B2* | 8/2012 | Eide | G06F 11/328 |
| | | | 714/25 |
| 8,621,130 B2* | 12/2013 | Daniel | G06F 13/4059 |
| | | | 710/313 |
| 9,172,724 B1* | 10/2015 | Reddy | H04L 63/20 |
| 9,898,777 B2* | 2/2018 | Chen | G06Q 30/0641 |
| 2001/0034598 A1* | 10/2001 | Swoboda | G01R 31/31705 |
| | | | 703/26 |
| 2006/0025985 A1* | 2/2006 | Vinberg | G06F 8/65 |
| | | | 703/22 |
| 2012/0311157 A1* | 12/2012 | Erickson | G06F 9/541 |
| | | | 709/226 |
| 2013/0346842 A1* | 12/2013 | Koara | G05B 19/048 |
| | | | 715/211 |
| 2014/0358734 A1* | 12/2014 | Sehgal | G06F 8/654 |
| | | | 705/27.1 |

(Continued)

*Primary Examiner* — Kibrom K Gebresilassie

(57) ABSTRACT

A computer device may include logic configured to receive, from a user device via a network, a manufacturer-independent request intended for a target device; identify a virtual device model instance associated with the target device; and identify a virtual device model associated with the identified virtual device model instance. The logic may be further configured to select a manufacturer adapter based on the identified virtual device model instance and the identified virtual device model; generate a manufacturer-specific request for the target device based on the received manufacturer-independent request and the selected manufacturer adapter; and send, via the network, the generated manufacturer-specific request to the target device.

20 Claims, 15 Drawing Sheets

(56) References Cited

U.S. PATENT DOCUMENTS

| | | | |
|---|---|---|---|
| 2015/0296022 A1* | 10/2015 | Kim | H04L 67/12 |
| | | | 709/203 |
| 2016/0055573 A1* | 2/2016 | Chen | G06Q 30/0641 |
| | | | 705/26.41 |
| 2016/0234686 A1* | 8/2016 | Bone | H04W 4/70 |
| 2016/0255066 A1* | 9/2016 | Green | H04W 4/70 |
| | | | 726/4 |
| 2016/0291826 A1* | 10/2016 | Verzano | H04L 41/145 |
| 2016/0308861 A1* | 10/2016 | Ameling | H04L 63/0876 |
| 2016/0338170 A1* | 11/2016 | Lebel | H05B 33/0857 |
| 2016/0345176 A1* | 11/2016 | DeWitt | G06Q 30/0261 |
| 2017/0008162 A1* | 1/2017 | Tsubota | G05B 19/00 |
| 2017/0270563 A1* | 9/2017 | Soni | G06Q 30/0255 |
| 2017/0289253 A1* | 10/2017 | Graefe | H04L 67/12 |
| 2017/0371937 A1* | 12/2017 | Shah | G06F 8/71 |

\* cited by examiner

803

```
{
   "Camera":{
      "baseType": "Switch",
      "type": "camera",
      "attributes";[
         {
            "name": "photoUrl",
            "type": "string",
         }
      ],
      "commands": [
         {
            "name": "takePicture",
            "args": []
         }
      ]
   }
}
```

850

```
{
   "Flash":{
      "type": "Light",
      "attributes";[
         {
            "name": "flashPattern",
            "type": "string",
         }
      ],
      "commands": [
         {
            "name": "flashOn",
            "attributes": [
               {
                  "name": "flashPattern",
                  "type": "string",
                  "required": "false"
               }
            ]
         },
         {
            "name": "flashOff",
            "attributes": []
         }
      ]
   }
}
```

```
{
    "Temperature":{
        "attributes";[
            {
                "name": "temperature",
                "type": "float",
                "unit": "string"
            }
        ]
    }
}
```
860

```
{
    "Thermostat":{
        "baseType": "Switch",
        "type": "thermostat",
        "attributes";[
            {
                "name": "SetTemp",
                "baseType": "temperature"
            }
        {
            "name": "CurrentTemp",
            "baseType": "temperature"
            }
        ],
        "commands": [
            {
                "name": "GetCurrentTemp",
                "args": []
            }
            {
                "name": "SetNewTemp",
                "args": [
                    {
                        "name": "NewTemp",
                        "baseType": "temperature"
                    }
                ]
            }
        ]
    }
}
```
862

VIRTUAL DEVICE MODEL SYSTEM

BACKGROUND INFORMATION

For particular types of devices, such as sensors or actuators, many different manufacturer models may be available. As an example, different makes and models of sensors may collect different types of information and may store the information in different formats. As another example, users may make requests or commands to devices using different applications with different formats. Furthermore, as the Internet of Things (IoT) continues to gain prominence, machine-to-machine (M2M) communication becomes more common. In order for two devices to communicate, the two devices may need to be configured to recognize each other's commands and data formats. Thus, systems that include different types of devices face various challenges.

BRIEF DESCRIPTION OF THE DRAWINGS

FIGS. 8B-8D are diagrams of exemplary device models associated with the system of FIG. 8A;

DETAILED DESCRIPTION OF PREFERRED EMBODIMENTS

Figure 1:
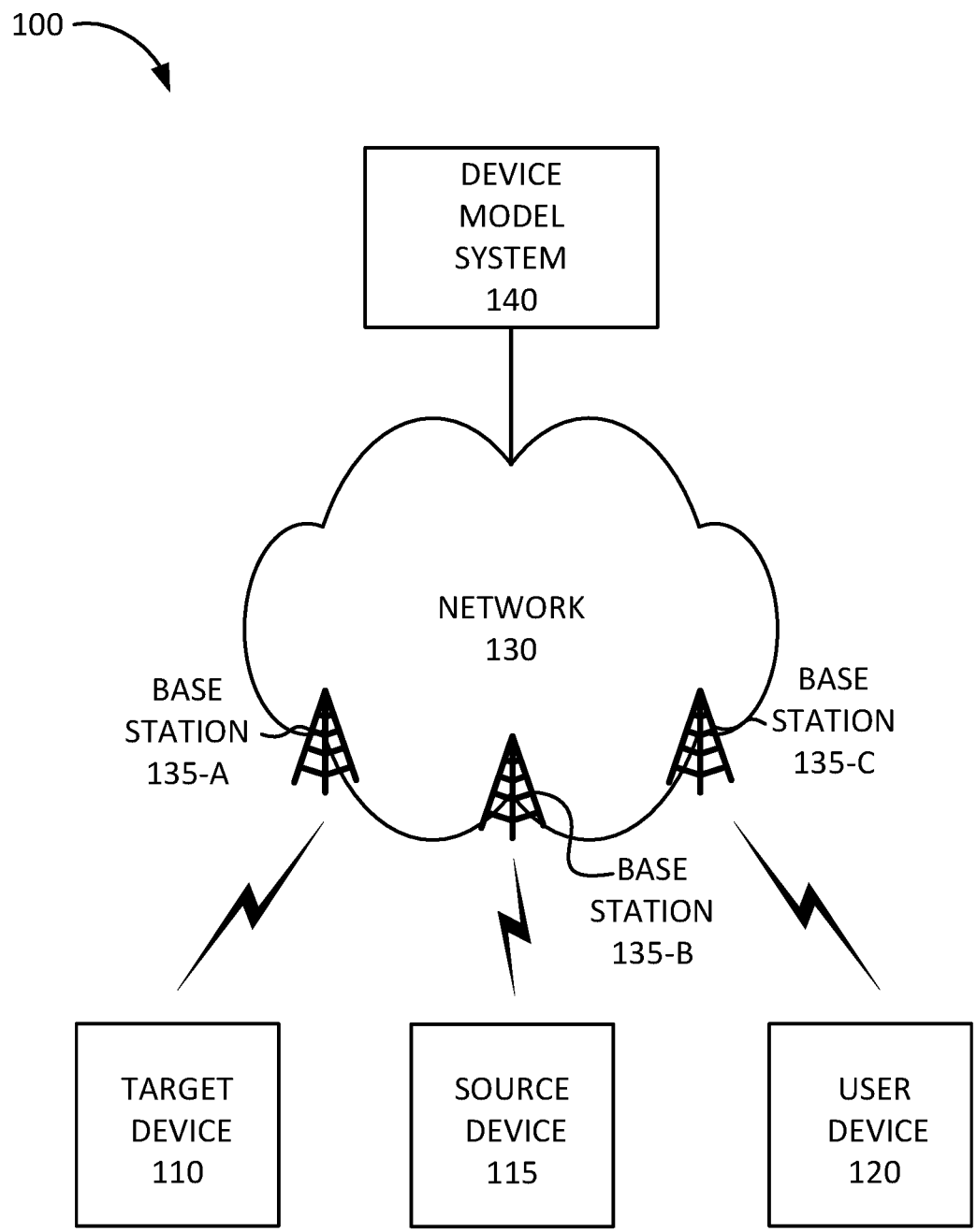
FIG. 1 is a diagram illustrating an environment according to an implementation described herein.

The following detailed description refers to the accompanying drawings. The same reference numbers in different drawings identify the same or similar elements.

Implementations described herein relate to a virtual device model system. A system may include a large number of different devices with different implementation details. For example, each manufacturer of a particular type of sensor or actuator may develop a different implementation of the sensor or actuator. The virtual device model system may hide the implementation details of particular devices by managing a hierarchy of virtual device models and an adapter framework to facilitate interoperability and platform independence for the devices.

An application developer that seeks to communicate with a particular device (e.g., to obtain data from a sensor, to send commands to an actuator, etc.) does not have to know the implementation of the particular device, such as a manufacturer's make or model of the particular device, a particular communication protocol and/or message format for communicating with the particular device. The virtual device model system may abstract away implementation differences and provide a unified model for programming and/or interacting with particular devices. An application that uses the virtual device model system may be able to communicate with a particular device type across multiple original equipment manufacturer (OEM) implementations of the particular device type. New devices added to the virtual device model system may be automatically supported by the application without requiring a change or update to the application. Furthermore, generic rules may be generated and executed based on particular types of messages received from particular types of devices associated with particular virtual models.

The virtual device model system may maintain a database of virtual device models. Each virtual device model may be associated with a particular device type and may include attributes and/or commands associated with the particular device type. As an example, a base sensor virtual device model may include at least one sensor attribute, a unit attribute that determines what unit the sensor attribute is measuring, and may include a command to read a value for the sensor attribute. As another example, a base actuator virtual device model may include at least one actuator attribute and may include a command to turn on or turn off the actuator attribute.

New virtual device models may be derived from existing base virtual device models. For example, a new virtual device model may inherit characteristics, such as attributes or commands, from a base virtual device model, while adding additional characteristics, such as additional attributes or commands or new restrictions being applied to existing attributes or commands. By deriving new virtual device models, a hierarchy of virtual device models may be generated based on a taxonomy of device types. As an example, a base sensor virtual device model may be used to derive new sensor virtual device models that specify particular attributes, such as a motion sensor device model, a temperature sensor device model, an accelerator sensor device model, a chemical sensor device model, a light sensor device model, a distance sensor device model, an occupancy sensor device model, a presence sensor device model, a tripwire sensor device model, etc. A particular sensor device model may be further used to derive more detailed or more defined sensor device models or to derive sensor device models with additional functionality. As an example, a basic motion sensor model may be used to derive a motion sensor model with a calibration function, a motion sensor model with a history function to record motion sensor data over a particular period of time, a motion sensor model with a threshold function to set a particular threshold for triggering a motion detection event, etc.

Similarly, a base actuator virtual device model may be used to derive new actuator virtual device models that specify particular attributes, such as a camera actuator device model, a light switch device model, a speaker device model, a rotational motor actuator device model, a linear motion actuator device model, a vibration motion actuator device model, a piezoelectric actuator device model, etc. A particular actuator device model may be further used to derive more detailed or more defined actuator device models or to derive actuator device models with additional functionality. As an example, a light switch device model may be used to derive a dimmable light switch device model, a color light switch device model, a flashlight device model, etc. Additional device models may be further derived from such derived models. For example, a color light switch device model may be used to derive a color red green blue (RGB) light device model.

Virtual device models may interface with device implementations through adapters. A particular adapter may convert generic virtual device model requests into requests associated with a particular device implementation, such as a particular communication protocol, command, or format associated with a particular make and model of the device implementation. Thus, an adapter may convert a manufacturer-independent request into a manufacturer-specific request. A particular virtual device model may be associated with multiple adapters. For example, a particular virtual device model may be associated with an adapter for each different device implementation, such as each different make and model of a device associated with the particular device model.

An adapter may convert attribute-value pairs from a manufacturer-independent request, associated with a virtual device model, to attribute-value pairs to be included in a manufacturer-specific request, associated with a particular device implementation, and/or may convert attribute-value pairs from a manufacturer-specific request, associated with a particular device implementation, to attribute-value pairs to be included in a manufacturer-independent request, associated with a virtual device model. For example, the adapter may identify a first set of attribute-value pairs associated with a manufacturer-independent request, identify a second set of attribute-value pairs associated with a manufacturer-specific request, and map the first set of attribute-value pairs to the second set of attribute-value pairs.

If the adapter determines that a particular set of attribute-value pairs has not been provided with a required value as a result of the mapping, the adapter may generate a default value for the particular set of attribute-value pairs. Furthermore, the adapter may, for a particular mapping of a first attribute-value pair to a second attribute-value pair, execute a conversion function to convert a first value to a second value. For example, a virtual device model instance may specify an attribute using a first measurement unit and a manufacturer implementation of a device, associated with the virtual model instance, may specify the attribute using a second measurement unit, and the conversion function may convert values in the first measurement unit to values in the second measurement unit.

Devices may be registered with the virtual device model system. When a new device is registered, the virtual device model system may generate a new virtual device model instance for the new device based on a virtual device model. The virtual device model system may be configured to receive a request to generate a new virtual device model instance for the device, identify a device type for the device, determine whether the identified device type is associated with an existing virtual device model, and generate a new virtual device model instance based on the existing virtual device model, when the identified device type is associated with an existing virtual device model. If there is no existing virtual device model, virtual device model system may determine that the identified device type is associated with another device type and may derive a new virtual device model from an existing device model associated with the other device type.

Furthermore, the virtual device model system may determine whether a compatible manufacturer adapter exists for the new virtual device model instance and associate the compatible manufacturer adapter with the new virtual device model instance, when a compatible manufacturer adapter exists. If no compatible manufacturer adapter exists, a new manufacturer adapter may be generated.

In some implementations, a user may interact with a target device using a user device. For example, a user may use a mobile phone or a tablet computer device to send a request to a target device. The mobile phone or tablet computer device may use an application that generates manufacturer-independent requests. For example, a request to turn on a light may be sent by the application to a particular target light device as a generic request to turn on a light that is independent of the make or model of the particular target light device. The virtual device model system may provide an application programming interface (API), for generating and accessing virtual device models and/or virtual device model instances, to the user device and may receive manufacturer-independent requests via the provided API. Moreover, the virtual device model system may provider wrappers for the API for particular operating systems. Thus, a particular operating system may use a provided wrapper to interact with the API.

The virtual device model system may be configured to receive, from a user device and via a network, a manufacturer-independent request for a target device. The virtual device model system may identify a virtual device model instance associated with the target device, may identify a virtual device model associated with the identified virtual device model instance, and may select a manufacturer adapter based on the identified virtual device model instance and the identified virtual device model. The virtual device model system may then generate a manufacturer-specific request for the target device based on the received manufacturer-independent request and the selected manufacturer adapter and may send the generated manufacturer-specific request to the target device. The target device may then carry out the request.

In other implementations, such as in an Internet of Things (IoT) implementation, a source device may communicate with a target device without requiring user participation. For example, the source device and the target device may be configured for machine-type communication (MTC), a type of machine-to-machine (M2M) communication standardized by the $3^{rd}$ Generation Partnership Project (3GPP). The source device and the target device may not need to be aware of particular implementations and may instead communicate with each other using virtual device models. For example, a source device may send a manufacturer-specific message to the virtual device model system.

The virtual device model system may receive the manufacturer-specific message from a source device, may identify a source device virtual device model instance associated with the source device, may identify a source device adapter associated with the source device virtual device model instance, and may generate a manufacturer-independent message using the identified source device adapter based on the received manufacturer-specific message. The virtual device model system may further determine a target device for the manufacturer-independent message and may provide the manufacturer-independent message to the determined target device. Providing the manufacturer-independent message to the determined target device may include identifying a virtual device model instance associated with the target device, identifying a virtual device model associated with the identified virtual device model instance, selecting a manufacturer adapter based on the identified virtual device model instance and the identified virtual device model, generating a manufacturer-specific message for the target device, and sending the generated manufacturer-specific message to the target device.

A virtual device model instance may be associated with one or more rules. For example, a rule may associate a particular message or request type with a particular action. The virtual device model system may execute any relevant rules when a message or request is received for a particular virtual device model instance. Rules may be generated and derived similarly to virtual device models. For example, a rule database may include rules for particular virtual device models and/or particular types of messages and a virtual device model instance may be associated with an existing rule in the rule database without having to generate a new rule each time a new virtual device model instance is created.

FIG. 1 is a diagram of an exemplary environment 100 in which the systems and/or methods, described herein, may be implemented. As shown in FIG. 1, environment 100 may include a target device 110, a source device 115, a user device 120, a network 130, and a device model system 140. In some implementations, target device 110 may receive a request from user device 120 using device model system 140 via network 130. The request may be, for example, to obtain data from target device 110 or to command target device 110 to perform an action. Target device 110 may send a response to user device 120. In other implementations, source device 115 may send a message to target device 110. Target device 110 and source device 115 may each include a wireless communication device configured to communicate with device model system 140 via network 130 using wireless mechanisms/protocols. Alternatively, target device 110 and/or source device 115 may include a wired connection to network 130.

Target device 110 and/or source device 115 may include one or more sensor devices that collect information from the environment, a person, and/or one or more other devices (not shown in FIG. 1). Examples of sensor devices may include an environment monitoring sensor (e.g., a temperature sensor, a humidity sensor, a pressure sensor, a wind speed sensor, a motion detector, a light detector, a camera, a microphone, etc.); a health monitoring sensor (e.g., a blood pressure monitoring device, a blood glucose monitoring device, etc.); a location sensor (e.g., a Global Positioning System receiver, etc.); a position or tilt sensor (e.g., an accelerometer, a gyroscope, etc.); a sensor monitoring one or more functions of a vehicle (e.g., a climate sensor, an engine sensor, etc.), a sensor monitoring an electronic sign (e.g., an electronic billboard, etc.), a sensor monitoring a manufacturing system (e.g., a robot arm sensor, an assembly line sensor, etc.), a security system sensor (e.g., a camera, a motion sensor, a window sensor, a lock sensor, a proximity sensor, etc.), a power system sensor (e.g., a smart grid monitoring device, etc.), a sensor monitoring a financial transaction system (e.g., a point-of-sale terminal, a vending machine, etc.), and/or another type of electronic sensor device.

Additionally or alternatively, target device 110 and/or source device 115 may include one or more actuator devices. An actuator device may include an electrical and/or mechanical mechanism to convert electrical and/or magnetic energy into motion. Examples of actuator devices may include a microelectromechanical (MEMS) actuator, an electric motor, a piezoelectric actuator, a pneumatic actuator, an electroactive polymer device, a thermal bimorph device, and/or another type of actuator device.

In some implementations, target device 110 and/or source device 115 may correspond to an embedded wireless device that communicates wirelessly with other devices over a machine-to-machine interface, such as machine-type communication (MTC), a type of M2M communication standardized by the 3$^{rd}$ Generation Partnership Project (3GPP), or another type of M2M communication. For example, target device 110 and/or source device 115 may be electrically connected to a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a parking meter, a point-of-sale terminal, a vending machine, etc.), and/or another type of electronic device.

User device 120 may include a handheld portable communication device (e.g., a mobile phone, a smart phone, a phablet device, a tablet computer, a global positioning system (GPS) device, etc.), a wearable computer device (e.g., a head-mounted display computer device, a wristwatch computer device, etc.); a laptop computer or another type of portable computer; a media playing device; a portable gaming system; and/or any other type of mobile computer device with communication capabilities. In some implementations, user device 120 may include an embedded wireless communication device. For example, user device 120 may be electronically connected to a microcontroller or application controller that communicates with target device 110.

Network 130 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Network 130 may allow the delivery of Internet Protocol (IP) services to target device 110, source device 115, and/or user device 120, and may interface with other external networks. Network 130 may include one or more base stations 135. For example, target device 110 may communicate with base station 135-A using wireless signals, source device 115 may communicate with base station 135-B using wireless signals, and/or user device 120 may communicate with base station 135-C using wireless signals. Alternatively, one or more of target device 110, source device 115, and/or user device 120 may communicate with network 130 via a same base station 135 or may be connected to network 130 using a wired connection.

Device model system 140 may include one or more devices, such as computer devices and/or server devices, which are configured to maintain, generate, and/or derive virtual device models. Furthermore, device model system 140 may generate a virtual device model instance for target device 110 and/or for source device 115 based on a virtual device model. Furthermore, device model system 140 may maintain and/or generate adapters for particular device implementations. Device model system 140 may convert manufacturer-independent requests or messages to manufacturer-specific requests and may convert manufacturer-specific requests to manufacturer-independent requests using the adapters.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
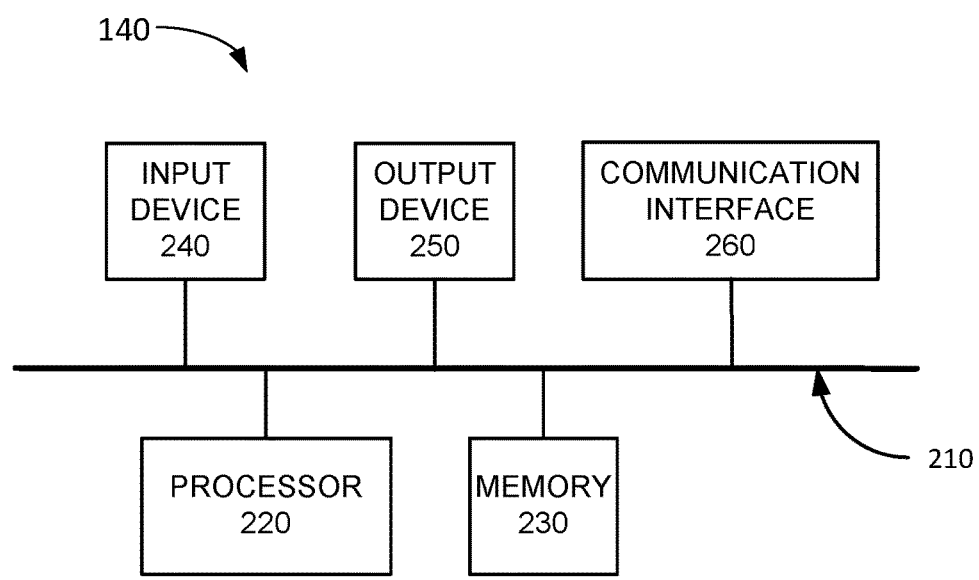
FIG. 2 is a diagram illustrating exemplary components of the device model system of FIG. 1.

FIG. 2 is a diagram illustrating exemplary components of device model system 140 according to an implementation described herein. As shown in FIG. 2, device model system 140 may include a bus 210, a processor 220, a memory 230, an input device 240, an output device 250, and a communication interface 260.

Bus 210 may include a path that permits communication among the components of device model system 140. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device model system 140. Input device 240 may include, for example, a keyboard, a mouse, a pen, a microphone, a remote control, an audio capture device, an image and/or video capture device, a touch-screen display, and/or another type of input device. In some embodiments, device model system 140 may be managed remotely and may not include input device 240. In other words, device model system 140 may be "headless" and may not include a keyboard, for example.

Output device 250 may output information to an operator of device model system 140. Output device 250 may include a display, a printer, a speaker, and/or another type of output device. For example, device model system 140 may include a display, which may include a liquid-crystal display (LCD) for displaying content to the customer. In some embodiments, device model system 140 may be managed remotely and may not include output device 250. In other words, device model system 140 may be "headless" and may not include a display, for example.

Communication interface 260 may include a transceiver that enables device model system 140 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device model system 140 may perform certain operations relating to virtual device models. Device model system 140 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device model system 140, in other implementations, device model system 140 may include fewer components, different components, additional components, or differently arranged components than depicted in FIG. 2. Additionally or alternatively, one or more components of device model system 140 may perform one or more tasks described as being performed by one or more other components of device model system 140.

Figure 3:
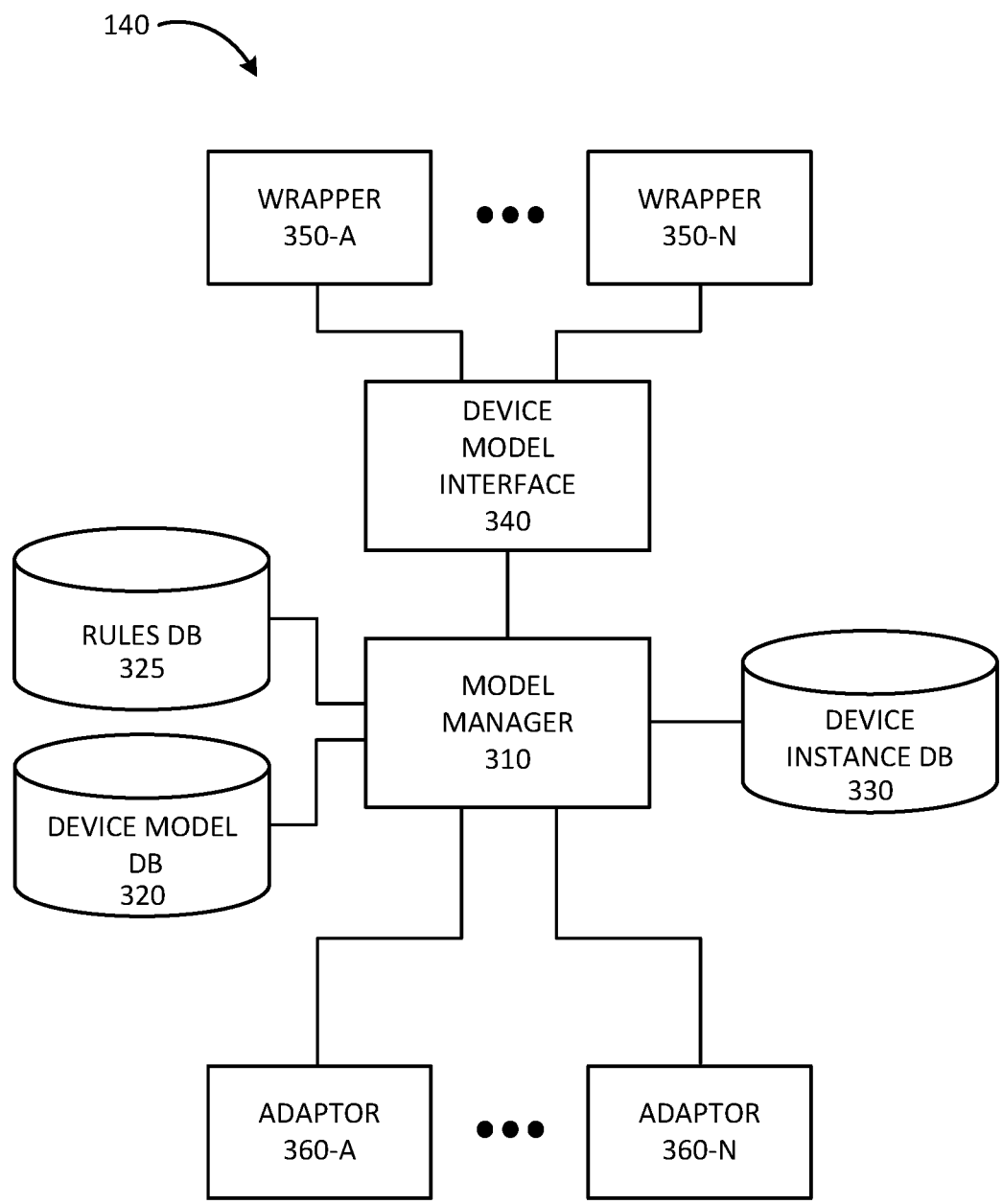
FIG. 3 is a diagram illustrating exemplary functional components of the device model system of FIG. 1.

FIG. 3 is a diagram illustrating exemplary functional components of device model system 140 according to an implementation described herein. The functional components of device model system 140 may be implemented, for example, via processor 220 executing instructions from memory 230. Alternatively, some or all of the functional components of device model system 140 may be implemented via hard-wired circuitry. As shown in FIG. 3, device model system 140 may include a model manager 310, a device model database (DB) 320, a rules DB 325, a device instance DB 330, a device model interface 340, one or more wrappers 350-A to 350-N, and one or more adapters 360-A to 360-N.

Model manager 310 may manage virtual device models and/or virtual device model instances. Model manager 310 may generate a new virtual device model or may derive a new virtual device model from an existing virtual device model. Furthermore, model manager 310 may generate a virtual device model instance for a device (e.g., target device 110, source device 115, etc.) based on a virtual device model and may select or generate an adapter 360 for the device based on the device implementation.

Furthermore, model manager 310 may process messages and/or requests for a device using information stored in device model DB 320, rules DB 325, and/or device instance DB 330 and may select a particular adapter 360 for generating a manufacturer-independent message into a manufacturer-specific message and/or for generating a manufacturer-specific message into a manufacturer-independent message.

Device model DB 320 may store information relating to virtual device models. Exemplary information that may be included in device model DB 320 is described below with reference to FIG. 4A. Rules DB 325 may store information relating to rules that may be associated with particular virtual device model instances. Exemplary information that may be included in rules DB 325 is described below with reference to FIG. 4B. Device instance DB 330 may store information relating to virtual device model instances associated with particular devices. Exemplary information that may be included in device instance DB 330 is described below with reference to FIG. 4C.

Device model interface 340 may be configured to communicate with target device 110, source device 115, and/or user device 120. For example, device model interface 340 may implement an API that may provide manufacturer-independent requests to model manager 310. Each wrapper 350 may be configured to communicate with a particular operating system (OS) and to interface a particular OS with device model interface 340. While shown as part of device model system 140, in other implementations, wrapper 350 may be implemented in target device 110, source device 115, and/or user device 120.

Each adapter 360 may be configured to communicate with a particular implementation (e.g., a manufacturer make and model, etc.) of a particular device type and be associated with a particular device model record 410. Adapter 360 may convert manufacturer-independent requests associated with the particular device model record 410 (see FIG. 4A) into manufacturer-specific requests associated with the particular implementation and may convert manufacturer-specific messages associated with the particular implementation into manufacturer-independent messages. Adapter 360 may map attribute-value pairs from a manufacturer-independent request to attribute-value pairs for a manufacturer-specific request and vice versa. Adapter 360 may execute a conversion to convert a first value to a second value when performing a mapping. Furthermore, adapter 360 may generate a default value for a particular attribute-value pair if a required value is not included in a received request or message. Moreover, adapter 360 may include information identifying particular memory locations or register locations in the device where particular instructions, commands, or collected information are stored. Thus, for example, a manufacturer-independent request may include a command to perform a particular action and a corresponding generated manufacturer-specific request may include a command to store a particular value in a particular memory or register location.

Although FIG. 3 shows exemplary functional components of device model system 140, in other implementations, device model system 140 may include fewer functional components, different functional components, additional functional components, or differently arranged functional components than depicted in FIG. 3. Additionally or alternatively, one or more functional components of device model system 140 may perform one or more tasks described as being performed by one or more other functional components of device model system 140.

Figure 4A:
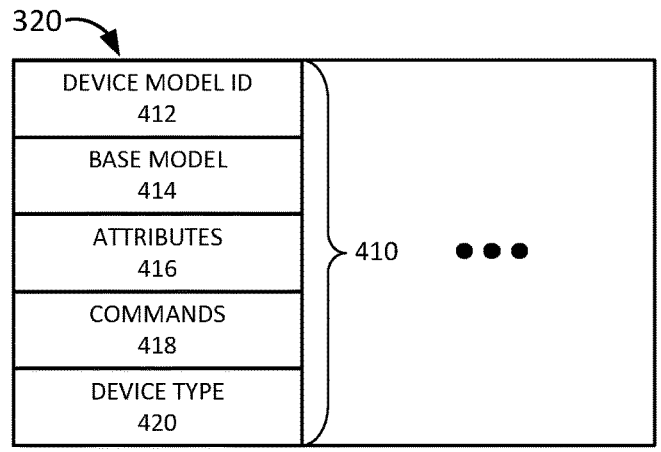
FIG. 4A is a diagram illustrating exemplary components of the device model database of FIG. 3.

FIG. 4A is a diagram illustrating exemplary components of device model DB 320. As shown in FIG. 4A, device model DB 320 may include one or more device model records 410. Each device model record 410 may store information relating to a particular device model. Device model record 410 may include a device model identifier (ID) field 412, a base model field 414, an attributes field 416, a commands field 418, and a device type field 420.

Device model ID field 412 may include an ID that uniquely identifies a particular device model. Base model field 414 may identify a base device model from which the particular device model is derived. For example, the particular device model may inherit attributes and/or commands of the base device model. If the particular device model is not derived from a base device model, base model field 414 may be empty.

Attributes field 416 may store one or more attributes associated with the particular device model. For example, an attribute may correspond to a measurement parameter, a parameter controlling the action of an actuator, a calibration parameter, a range parameter, a parameter identifying a device setting, and/or another type of attribute.

Commands field 418 may store one or more commands associated with the particular device model. For example, commands field 418 may store a command to obtain a sensor value from a sensor device, a command to activate an actuator, a command to calibrate a device, a command to change a device setting, a command to authenticate a device, a command to cause a device to enter a power saving mode, and/or another type of command.

Device type field 420 may identify a device type associated with the particular device model. For example, device type field 420 may include a description of the device type, one or more keywords identifying the device type, information relating to a hierarchical categorization of the device type, and/or other types of device type information.

Although FIG. 4A shows exemplary components of device model DB 320, in other implementations, device model DB 320 may include fewer components, different components, additional components, or differently arranged components than depicted in FIG. 4A.

Figure 4B:
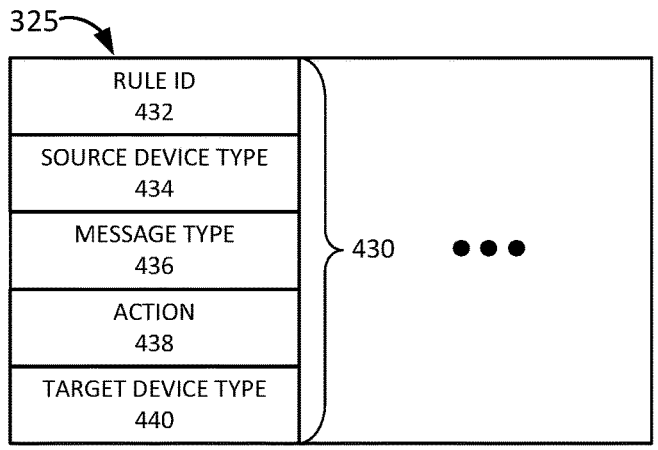
FIG. 4B is a diagram illustrating exemplary components of the rules database of FIG. 3.

FIG. 4B is a diagram illustrating exemplary components of rules DB 325. As shown in FIG. 4B, rules DB 325 may include one or more rule records 430. Each rule record 430 may store information relating to a particular rule. Rule record 430 may include a rule ID field 432, a source device type field 434, a message type field 436, an action field 438, and a target device type field 440.

Rule ID field 432 may include an ID that uniquely identifies a particular rule. Source device type field 434 may identify a type of source device associated with the particular rule. Message type field 436 may identify a type of message associated with the particular rule. Action field 438 may identify a particular action associated with the particular rule. Target device type field 440 may identify a particular type of target device associated with the particular rule.

When the particular type of message is received from a source device of the particular source device type, the particular action may be executed. As an example, when a motion detected message is received from a motion detector device, an instruction may be sent to a light switch device. As another example, if a malfunction message is received from a first device in a set of devices, another device from the set of devices may be instructed to activate. As yet another example, if a device sends a message indicating a particular trigger condition, the same device may be instructed to perform an action or enter into a particular state.

Although FIG. 4B shows exemplary components of rules DB 325, in other implementations, rules DB 325 may include fewer components, different components, additional components, or differently arranged components than depicted in FIG. 4B.

Figure 4C:
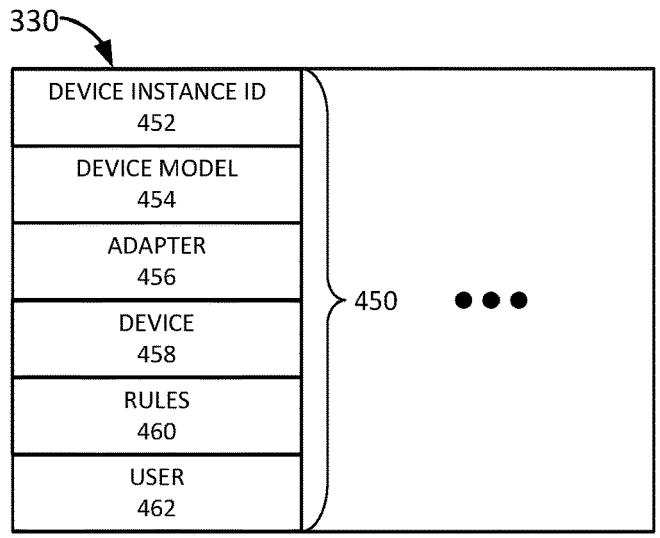
FIG. 4C is a diagram illustrating exemplary components of the device instance database of FIG. 3.

FIG. 4C is a diagram illustrating exemplary components of device instance DB 330. As shown in FIG. 4C, device instance DB 330 may include one or more device model instance records 450. Each device model instance record 450 may store information relating to a particular device model instance associated with a particular target device 110 or source device 115. Device model instance record 450 may include a device instance ID field 452, a device model field 454, an adapter field 456, a device field 458, a rules field 460, and a user field 462.

Device instance ID field 452 may include an ID that uniquely identifies a particular device model instance. Device model field 454 may identify a particular device model record 410 from device model DB 320 on which the particular device model instance is based. Adapter field 456 may identify a particular adapter 360 associated with the particular device model instance. Device field 458 may identify the physical device (e.g., target device 110, source device 115, etc.) associated with the particular device model instance. For example, device field 458 may include a name and/or description for the device, information identifying a manufacturer and/or make and model for the device, and/or an one or more addresses for the device. The one or more addresses for the device may include a Media Access Control (MAC) address, an Internet Protocol (IP) address, a wireless telephone number assigned to the device (e.g., a Mobile Directory Number (MDN), an International Mobile Subscriber Identity (IMSI), a Mobile Station International Subscriber Directory Number (MSISDN), etc.), and/or another type of address.

Rules field 460 may identify one or more rules associated with the particular device model instance. For example, rules field 460 may identify one or more rules records 430 from rules DB 325. User field 462 may identify a user associated with the particular device model instance. For example, user field 462 may identify a subscription account associated with a particular user, may identify user device 120, may identify a username and password, and/or may include other types of user information. Furthermore, user field 462 may include authentication and/or authorization information for the device, such as information used to authenticate messages and/or request to and from the device, information identifying users, devices, or other entities that are authorized to communicate with the device or to send requests to the device, and/or other types of authentication and/or authorization information.

Although FIG. 4C shows exemplary components of device instance DB 330, in other implementations, device instance DB 330 may include fewer components, different components, additional components, or differently arranged components than depicted in FIG. 4C.

Figure 5:
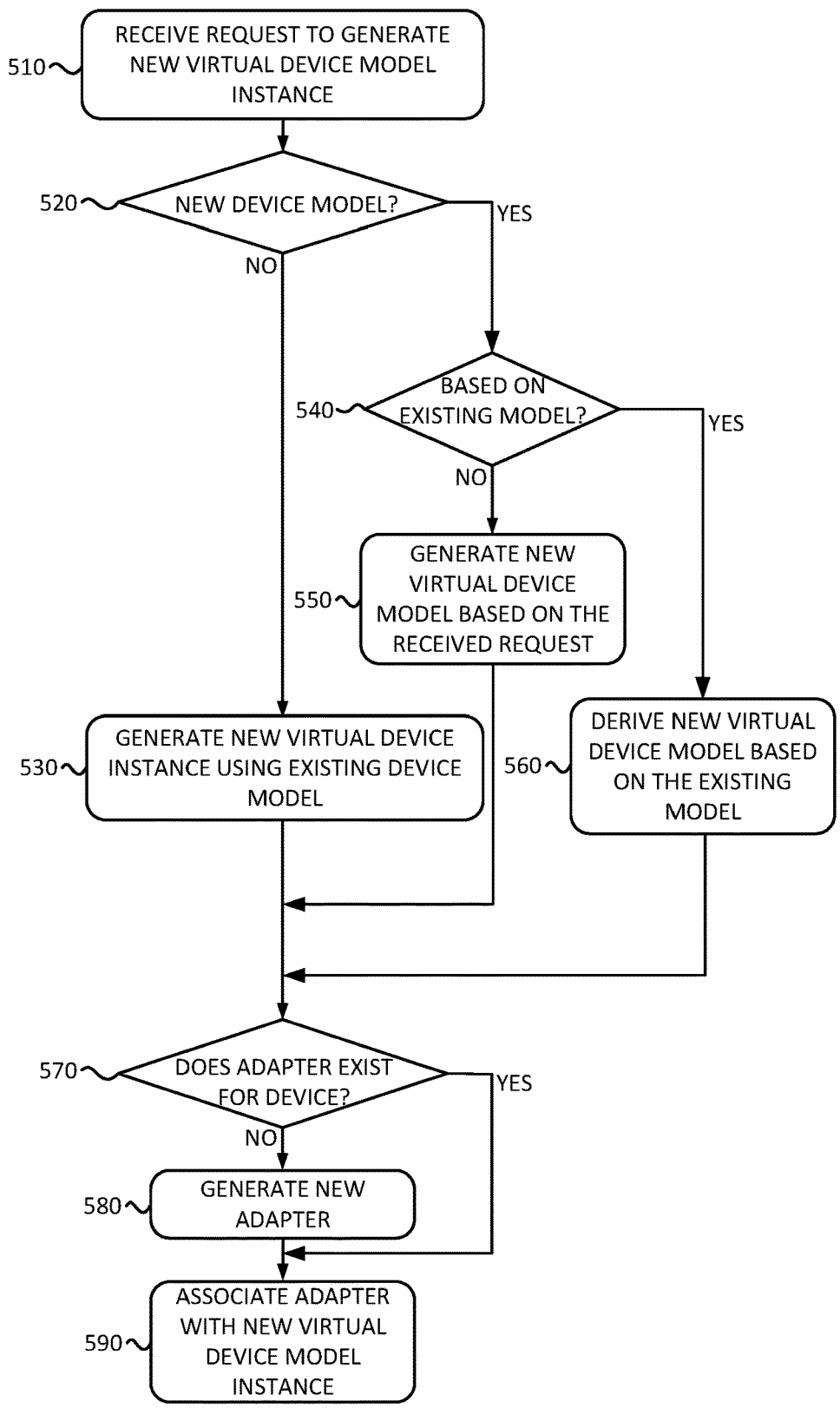
FIG. 5 is a flowchart of an exemplary process for configuring a device model according to an implementation described herein.

FIG. 5 is a flowchart of an exemplary process for configuring a device model according to an implementation described herein. In some implementations, the process of FIG. 5 may be performed by device model system 140. In other implementations, some or all of the process of FIG. 5 may be performed by another device or a group of devices separate from device model system 140 or including device model system 140.

The process of FIG. 5 may include receiving a request to generate a new virtual device model instance (block 510). For example, a user may use an application installed on user device 120 to request, via an API made available by device model system 140, to register a new device (e.g., target device 110, source device 115, etc.) with device model system 140. In response, device model system 140 may generate a new device model instance record 450 in device instance DB 330. The user may provide information identifying the user and information identifying the device, such as name, description, device type, make and model for the device. The user may further provide an address for the device as well as authentication and/or authorization information for the device. The obtained information may be stored in device field 458 and in user field 462 of the created device model instance record 450.

A determination may be made as to whether the new virtual device model instance requires a new device model (block 520). For example, model manager 310 may access device model DB 320 to determine whether a model exists for the device based on the device type information provided by the user. Alternatively, the user may select a device model for the device or may indicate that a new device model is to be created.

If it is determined that a new device model is not required (block 520—NO), an existing device model may be used to generate a new virtual device instance (block 530). If model manager 310 identifies a device model record 410, model manager 310 may populate device model field 454 with information from the identified device model record 410. Furthermore, attribute values for the device model instance may be provided based on information provided by the user, based on default values associated with the device model, based on querying the device, based on querying information relating to the device stored in user device 120, and/or using another technique. Processing may continue to block 570.

Returning to block 520, if it is determined that a new device model is required (block 520—YES), a determination may be made as to whether the new device model is to be based on an existing model (block 540). For example, device model system 140 may determine whether a device model exists for the device type associated with the device that could be used as a base mode to derive a new device model. If it is determined that the new device model is not to be based on an existing model (block 540—NO), a new virtual device model may be generated based on the received request (block 550). For example, a new device model record 410 may be generated in device model DB 320 and attributes and/or commands for the new device model record 410. Processing may continue to block 570.

Returning to block 540, if it is determined that the new device model is to be based on an existing model (block 540—YES), a new virtual device model may be derived from the existing model (block 560). For example, the user may select to use a base model to generate a new device model for the device model instance. A new device model record 410 may be created in device model DB 320 and the base model may be used to inherit attributes and/or commands for the new device model record 410. Additional attributes and/or commands may then be added by the user, or by an administrator of device model system 140, to create the new device model record 410. Processing may continue to block 570.

A determination may be made as to whether an adapter exists for the device (block 570). For example, device model system 140 may determine whether an adapter for the type of the device exists for the make and model of the device implementation associated with the new device model instance record 450. If it is determined that an adapter does not exist for the device (block 570—NO), a new adapter may be generated (block 580). For example, device model system 140 may generate a new adapter based on the device model associated with the new device model instance record 450 and based on the make and model implementation of the device associated with the new device model instance record 450. For example, each attribute of the make and model implementation may be mapped to an attribute of the device model and each command of the make and model implementation may be mapped to a command for the device model. Attribute-value pairs for the attributes and/or commands of the make and model implementation, which include specified values, may be mapped to attribute-value pairs of the device model. One or more conversion functions may be generated to convert values from manufacturer-independent request to values for a manufacturer-specific request and vice versa. Furthermore, one or more default values may be specified if a required value is not included in a received message or request. After generating the new adapter 360, device model system 140 may associate the generated adapter 360 with the new device model instance record 430 (block 590).

If it is determined that an adapter does exist for the device (block 570—YES), the existing adapter may be associated with the new virtual device model instance (block 590). For example, device model system 140 may select an existing adapter 360 and may associate the selected adapter with the new device model instance record 430.

Figure 6:
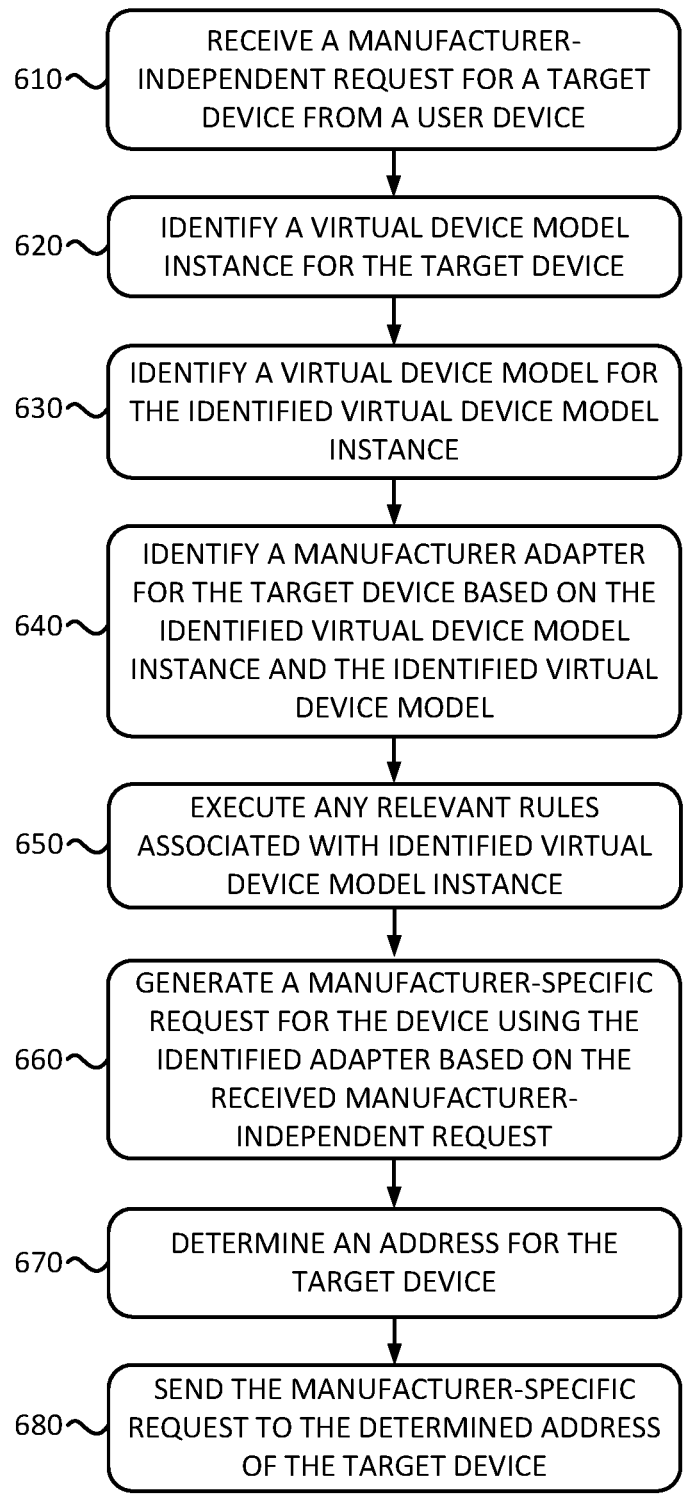
FIG. 6 is a flowchart of an exemplary process for processing a device model instance request according to an implementation described herein.

FIG. 6 is a flowchart of an exemplary process for processing a device model instance request according to an implementation described herein. In some implementations, the process of FIG. 6 may be performed by device model system 140. In other implementations, some or all of the process of FIG. 6 may be performed by another device or a group of devices separate from device model system 140 or including device model system 140.

The process of FIG. 6 may include receiving a manufacturer-independent request for a target device from a user device (block 610). A user may utilize user device 120 to send a manufacturer-independent request to target device 110. As an example, target device 110 may correspond to a device that is part of a home automation or security system and the user may use a home automation application on user device 120 to control the device. As another example, target device 110 may correspond to a health monitoring device (e.g., a pulse monitor, a blood glucose sensor, etc.) and the user may use a health monitoring application on user device 120 to obtain sensor data from the health monitoring device. As yet another example, target device 110 may correspond to a manufacturing system device (e.g., a robot arm, an assembly line gate controller, etc.) and user device 120 may correspond to a controlling device and the user may the controlling device to send an instruction to the manufacturing system device.

A virtual device model instance may be identified for the target device (block 620), a virtual device model for the identified virtual device model instance may be identified (block 630), and a manufacturer adapter may be identified for the target device based on the identified virtual device model instance and the identified virtual device model (block 640). For example, model manager 310 may identify a device model instance record 450 based on information included in the manufacturer-independent request. For example, the manufacturer-independent request may include the device instance ID of the device model instance record 450. Model manager 310 may further identify the device model record 410 associated with the identified device model instance record 450 based on information stored in device model field 454 and may identify adapter 360 associated with the identified device model instance record 450 based on information stored in adapter field 456.

Any relevant rules associated with the identified virtual device model instance may be executed (block 650). For example, model manager 310 may access rules field 460 to determine whether any rules are relevant to the received manufacturer-independent request. If one or more rules are identified as being relevant by, for example, matching a message type associated with the received manufacturer-independent request, model manager 310 may execute the actions associated with the identified one or more rules. In some examples, the action may be to authenticate the request before carrying out the request; to send a message to another device or process (e.g., a billing system device that bills the user for using device model system 140, a process logging requests, process checking parental permission, etc.) to inform the other device that the request has been received; and/or may perform another type of action.

A manufacturer-specific request may be generated using the identified adapter based on the received manufacturer-independent request (block 660). For example, model manager 310 may use the identified adapter 360 by converting the received manufacturer-independent request into a manufacturer-specific request by mapping attribute-value pairs included in the manufacturer-independent request to attribute-value pairs for the manufacturer-specific request. Additionally or alternatively, a manufacturer-independent request may include a command to perform a particular action and a corresponding generated manufacturer-specific request may include a command to store a particular value in a particular memory or register location based on the command to perform the particular action.

An address of the target device may be determined (block 670) and the manufacturer-specific request may be sent to the determined address of the target device (block 680). For example, model manager 310 may determine the address of target device 110 (e.g., an IP address, an MDN, etc.) based on information stored in device field 458 of the identified device model instance record 450 and may send the generated manufacturer-specific request to target device 110.

Figure 7:
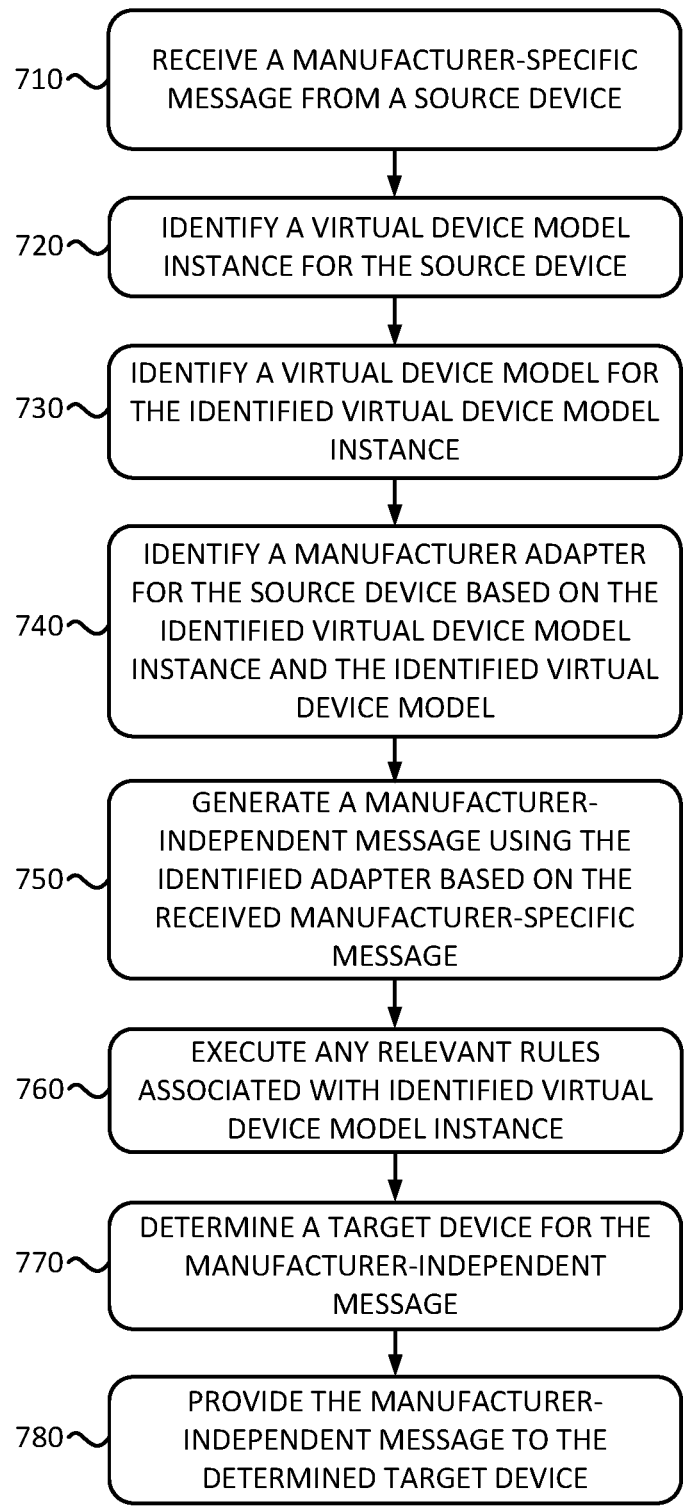
FIG. 7 is a flowchart of an exemplary process for processing a source device message according to an implementation described herein.

FIG. 7 is a flowchart of an exemplary process for processing a source device message according to an implementation described herein. In some implementations, the process of FIG. 7 may be performed by device model system 140. In other implementations, some or all of the process of FIG. 7 may be performed by another device or a group of devices separate from device model system 140 or including device model system 140.

The process of FIG. 7 may include receiving a manufacturer-specific message from a source device (block 710). As an example, source device 115 may send a manufacturer-specific message to target device 110 in an M2M implementation. As another example, source device 115 may send a manufacturer-specific message to user device 120 based on a user configuration of source device 115. The message may include a sensor device providing a sensor measurement or reporting a detected trigger event, a device reporting a change in a device status, a device reporting a malfunction, a controller device sending an instruction to an actuator device, an actuator or controller device requesting a sensor measurement or a status update from another device, and/or another type of message.

A virtual device model instance may be identified for the source device (block 720), a virtual device model for the identified virtual device model instance may be identified (block 730), and a manufacturer adapter may be identified for the source device based on the identified virtual device model instance and the identified virtual device model (block 740). For example, model manager 310 may identify a device model instance record 450 based on information included in the manufacturer-specific message. For example, the manufacturer-specific message may include information identifying the device which may be matched with information stored in device field 458 of the identified device model instance record 450. Model manager 310 may further identify the device model record 410 associated with the identified device model instance record 450 based on information stored in device model field 454 and may identify adapter 360 associated with the identified device model instance record 450 based on information stored in adapter field 456.

A manufacturer-independent message may be generated using the identified adapter based on the received manufacturer-specific message (block 750). For example, model manager 310 may use the identified adapter 360 by converting the received manufacturer-specific message into a manufacturer-independent message by mapping attribute-value pairs included in the manufacturer-specific message to attribute-value pairs for the manufacturer-independent message. Any relevant rules associated with the identified virtual device model instance may be executed (block 760). For example, model manager 310 may access rules field 460 to determine whether any rules are relevant to the generated manufacturer-independent message. If one or more rules are identified as being relevant by, for example, matching a message type associated with the generated manufacturer-independent message, model manager 310 may execute the actions associated with the identified one or more rules (as explained above with reference to block 650 of FIG. 6).

A target device may be determined for the generated manufacturer-independent message (block 770) and the generated manufacturer-independent message may be provided to the determined target device (block 780). For example, model manager 310 may determine the target device 110 based on information included in the received manufacturer-specific message and/or based on a rule associated with identified device model instance record 450. The generated manufacturer-independent message may be provided to the determined target device. As an example, if the target device corresponds to user device 120, device model system 140 may send the generated manufacturer-independent message to user device 120. As another example, if the target device corresponds to target device 110, device model system 140 may perform the process of FIG. 6 to generate a manufacturer-specific message for target device 110 based on the generated manufacturer-independent message.

Figure 8A:
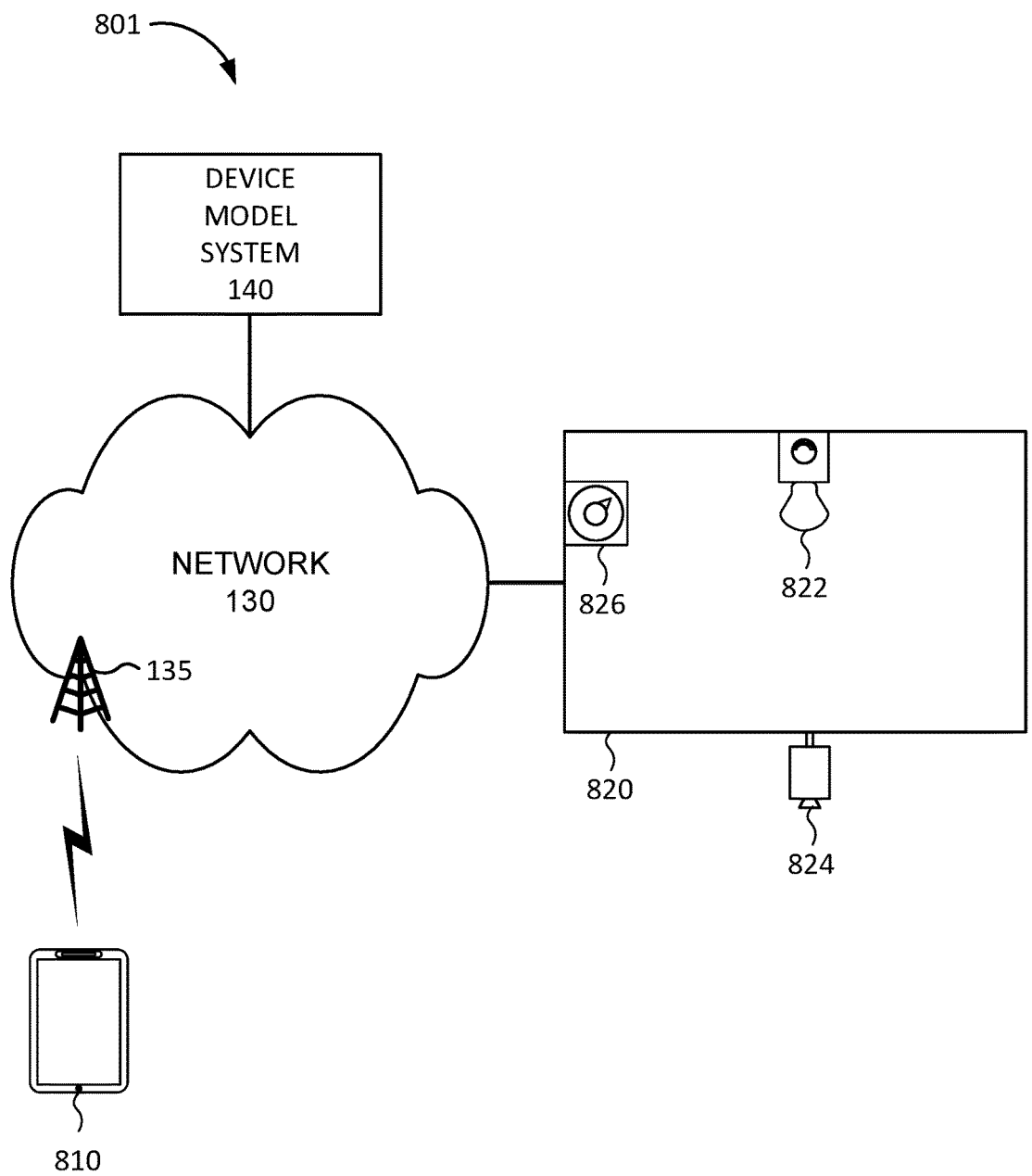
FIG. 8A is a diagram of a first exemplary system according to an implementation described herein.

FIG. 8A is a diagram of an exemplary system 801 according to an implementation described herein. As shown in FIG. 8A, system 801 may include a mobile phone 810, network 130, device model system 140, and a user home 820. System 801 may include a home automation and security system located at user home 820, which includes a dimmable light source 822, a security camera 824, and a thermostat 826. Mobile phone 810 may include a home automation and security application for controlling dimmable light source 822, security camera 824, and/or thermostat 826.

Figure 8B:
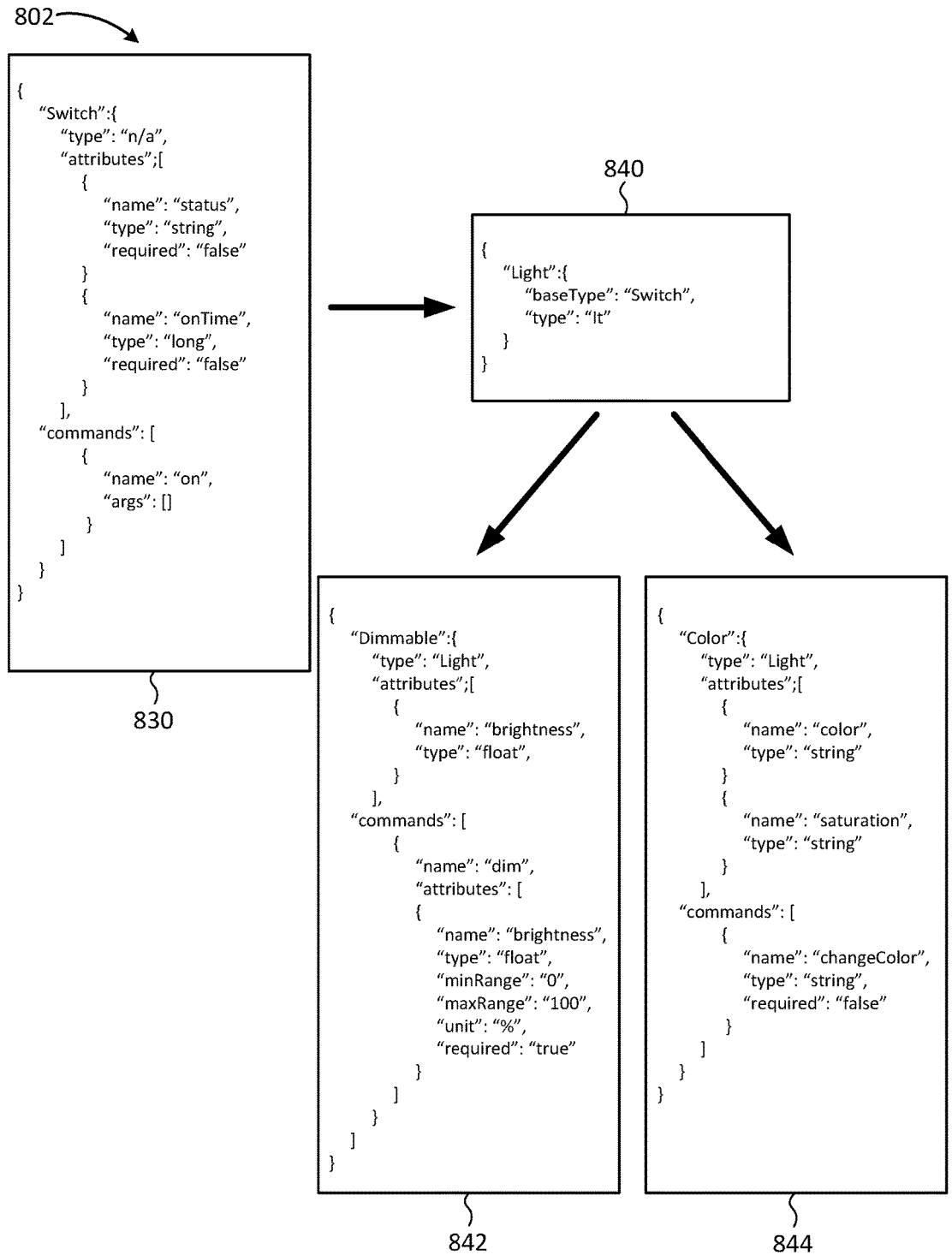

FIGS. 8B-8D are diagrams of exemplary device models associated with the system of FIG. 8A. FIG. 8B illustrates model hierarchy 802 written in JavaScript Object Notation (JSON). Model hierarchy 802 may include a base switch model 830, a light switch model 840, a dimmable light switch model 842, and a color light switch model 844. Light switch model 840 may be derived from base switch model 830 through inheritance. Dimmable light switch model 842 and color light switch model 844 may both be derived from light switch model 840 through inheritance. While model hierarchy 802 is illustrated as being written in JSON, in other implementations, models may be written in another format or language (e.g., Extensible Markup Language (XML), etc.). Dimmable light switch model 842 may be used to generate a device model instance for dimmable light source 822.

FIG. 8C illustrates additional models 803 associated with system 801. As shown in FIG. 8C, models 803 may include a camera model 850 and a flash model 852, which may both be used to generate device model instances for security camera 824. Camera model 850 may be derived from base switch model 830 through inheritance. Flash model 852 may be derived from light switch model 840 through inheritance. Camera model 850 may be used to instruct security camera 824 to take a picture and flash model 852 may be used to instruct a flash device associated with security camera 824 to generate a flash while taking a picture.

FIG. 8D illustrates additional models 804 associated with system 801. As shown in FIG. 8D, models 804 may include a temperature model 860 and a basic thermostat model 862. Temperature model 860 may define a temperature attribute that may be used both as a sensor value and as an actuator value. Thermostat model 862 may be derived from temperature model 860 by inheriting the temperature attribute to measure a current temperature value as well as to set a temperature for thermostat 826.

Figure 8E:
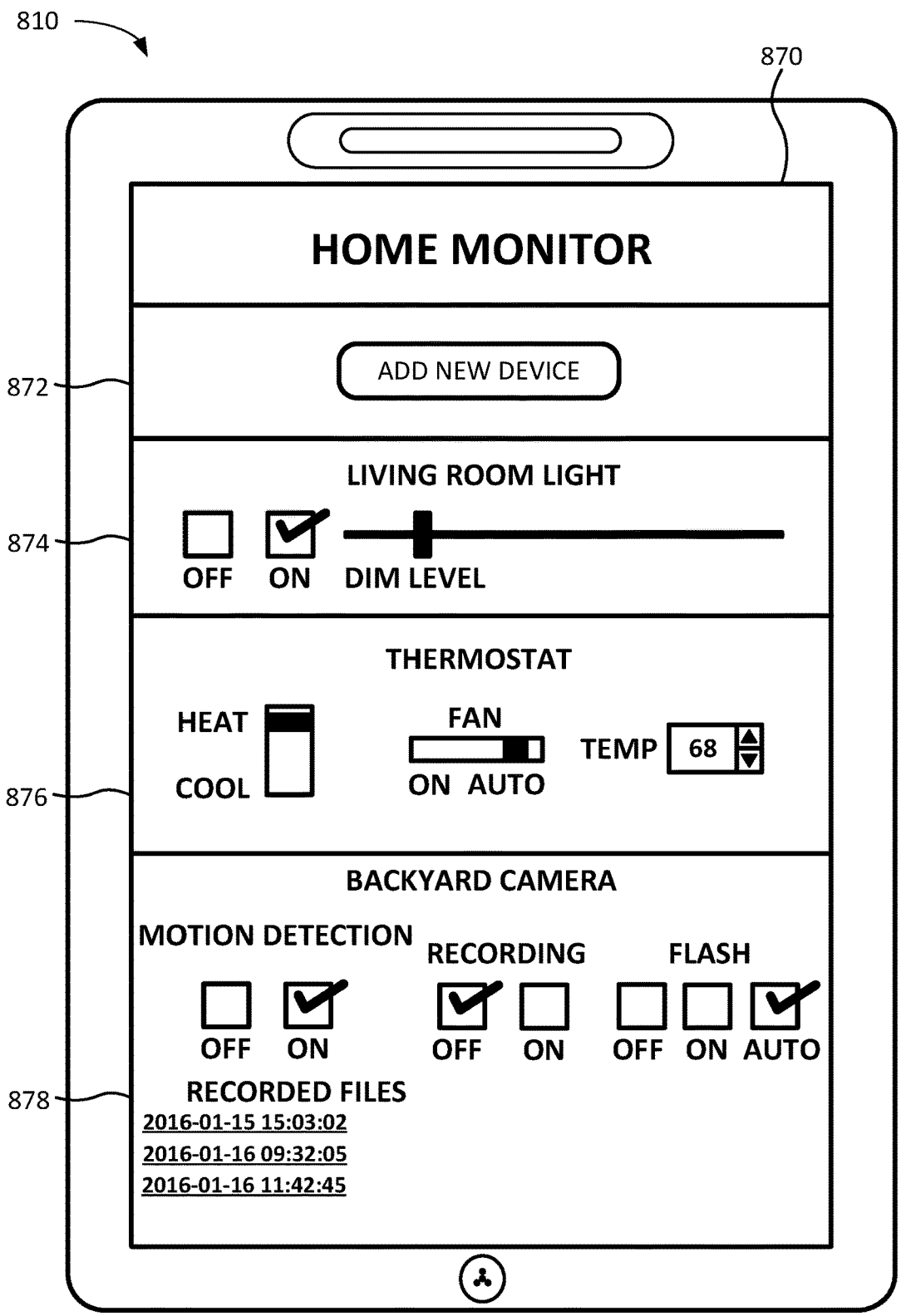
FIG. 8E is a diagram of an exemplary user interface associated with the system of FIG. 8A.

FIG. 8E is a diagram of an exemplary user interface for a home automation and security application running on mobile phone 810. As shown in FIG. 8E. mobile phone 810 may include a user interface 870 that includes a first area 872 for registering new devices with the application via device model system 140, a second area 874 for controlling dimmable light source 822, a third area 876 for controlling thermostat 826, and a fourth area for controlling security camera 824. The application running on mobile phone 810 does not need to know any details about the make and model of dimmable light source 822, security camera 824, and/or thermostat 826 or any specific commands for controlling these devices. Rather, the application may only need to know the device types for each of dimmable light source 822, security camera 824, and/or thermostat 826 and how to contact the devices, and may only need to send generic commands to the device model instances for the devices maintained by device model system 140.

Figure 8F:
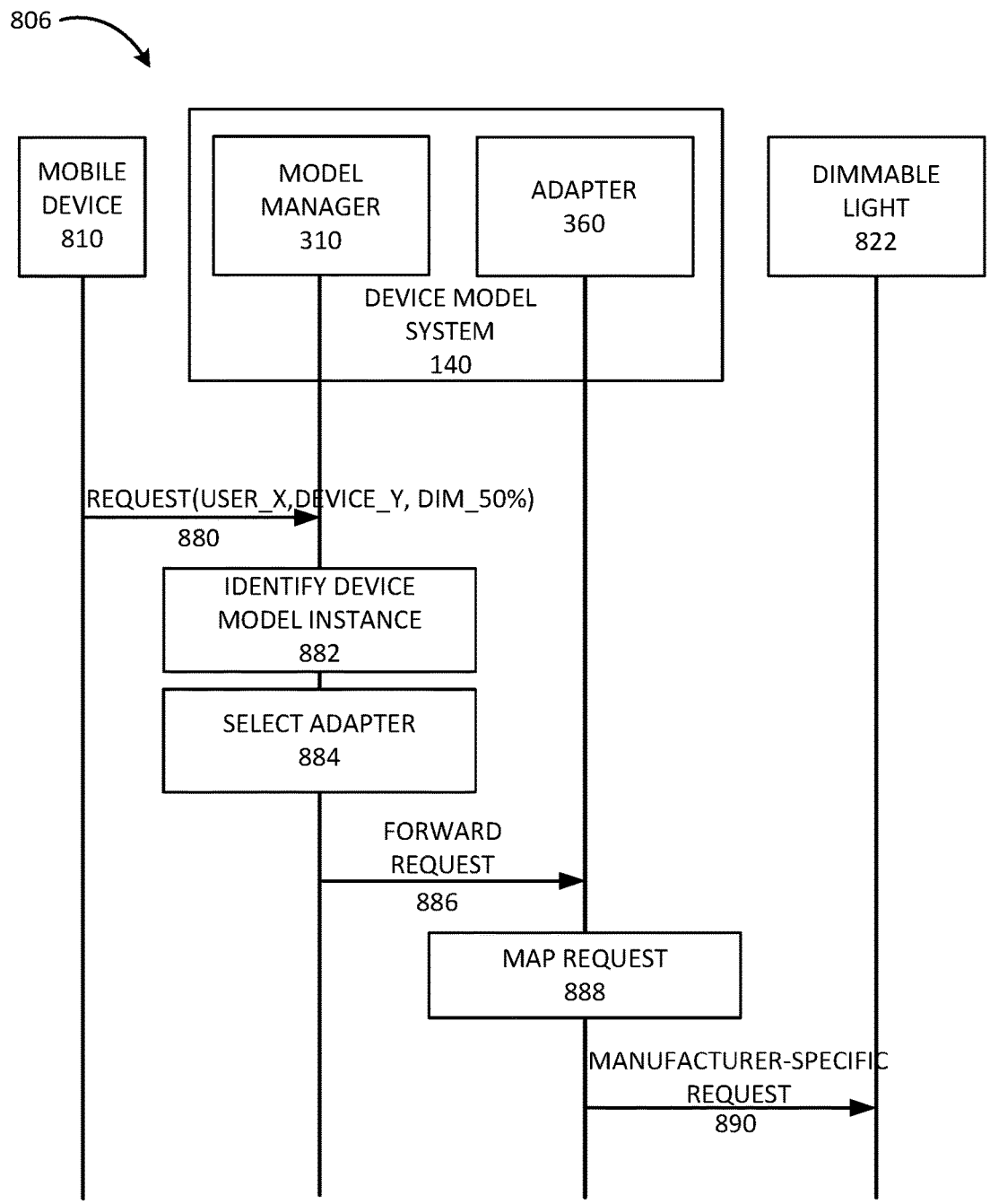
FIG. 8F is a diagram of an exemplary signal flow associated with the system of FIG. 8A.

FIG. 8F is a diagram of an exemplary signal flow 806 associated with system 801. As shown in FIG. 8F, mobile device 810 may send a request from user X to device Y to dim device Y to 50% (signal 880). User X may correspond to the user of mobile device 810 associated with user home 820 and device Y may identify the device model instance for dimmable light source 822. Model manager 310 may receive the request, may identify the device model instance associated with dimmable light source 822 (block 882) and may select the adapter 360 associated with the identified device model instance (block 884). Model manager 310 may provide the request to adapter 360 (signal 886). Adapter 360 may map the request to a manufacturer-specific request for dimmable light 822 (block 888) and may send the manufacturer-specific request 890 to dimmable light 822 (signal 890). In response, dimmable light 822 may dim the light source to 50%. The mapping of the manufacturer-independent request to the manufacturer-specific request may include, for example, instructing dimmable light 822 to store a value in a particular register that controls the amount of dimming of the light. The address of the particular register may be identified by adapter 360 during the mapping.

Figure 9A:
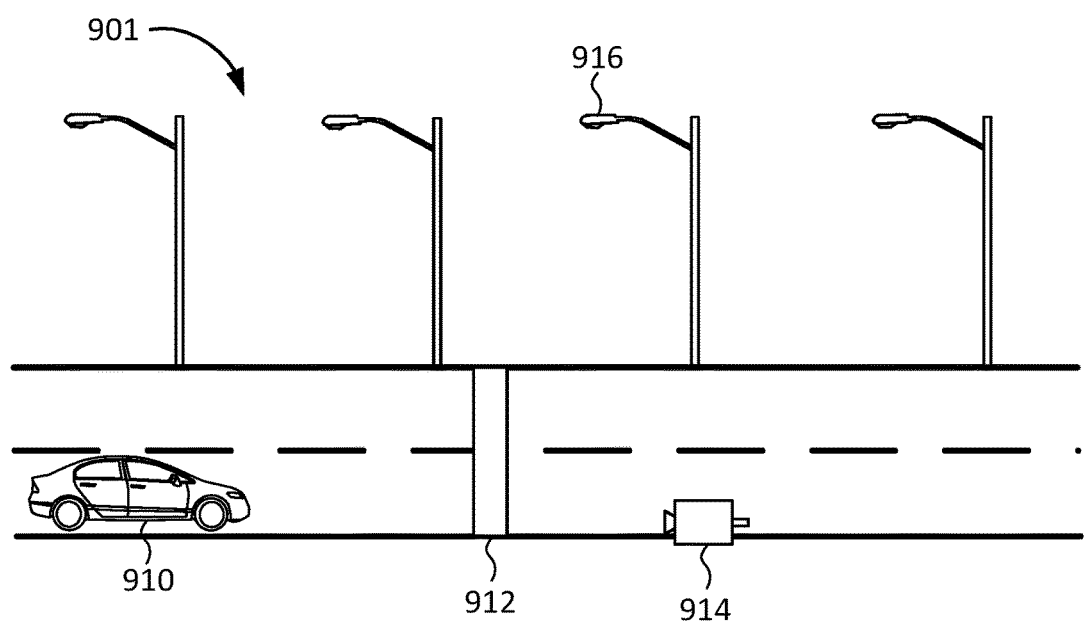
FIG. 9A is a diagram of a first exemplary system according to an implementation described herein.

FIG. 9A is a diagram of a second exemplary system 901 according to an implementation described herein. System 901 illustrates an IoT implementation that includes M2M communication between a sensor device and an actuator device. As shown in FIG. 9A, system 901 includes a vehicle 910 driving down a street that is configured with smart street lighting. The smart street lighting includes a road sensor 912 that detects movement, a camera 914, and street lights 916. When either road sensor 912 or camera 914 detect movement of vehicle 910, street lights 916 within a particular range of vehicle 910 illuminate the road. Thus, lights 916 do not need to be turned on when no vehicles are present, thereby reducing power. Furthermore, device model system 140 may be configured for such an implementation without specifying the device implementation details for road sensors 912, cameras 914, and/or street lights 916. Thus, different types of road sensors 912, cameras 914, and/or street lights 916 from different manufacturers may be used without having to change the configuration of the models or rules in device model system 140. Rather, only different adapters 360 may need to be associated with device model instances for road sensors 912, cameras 914, and/or street lights 916.

Figure 9B:
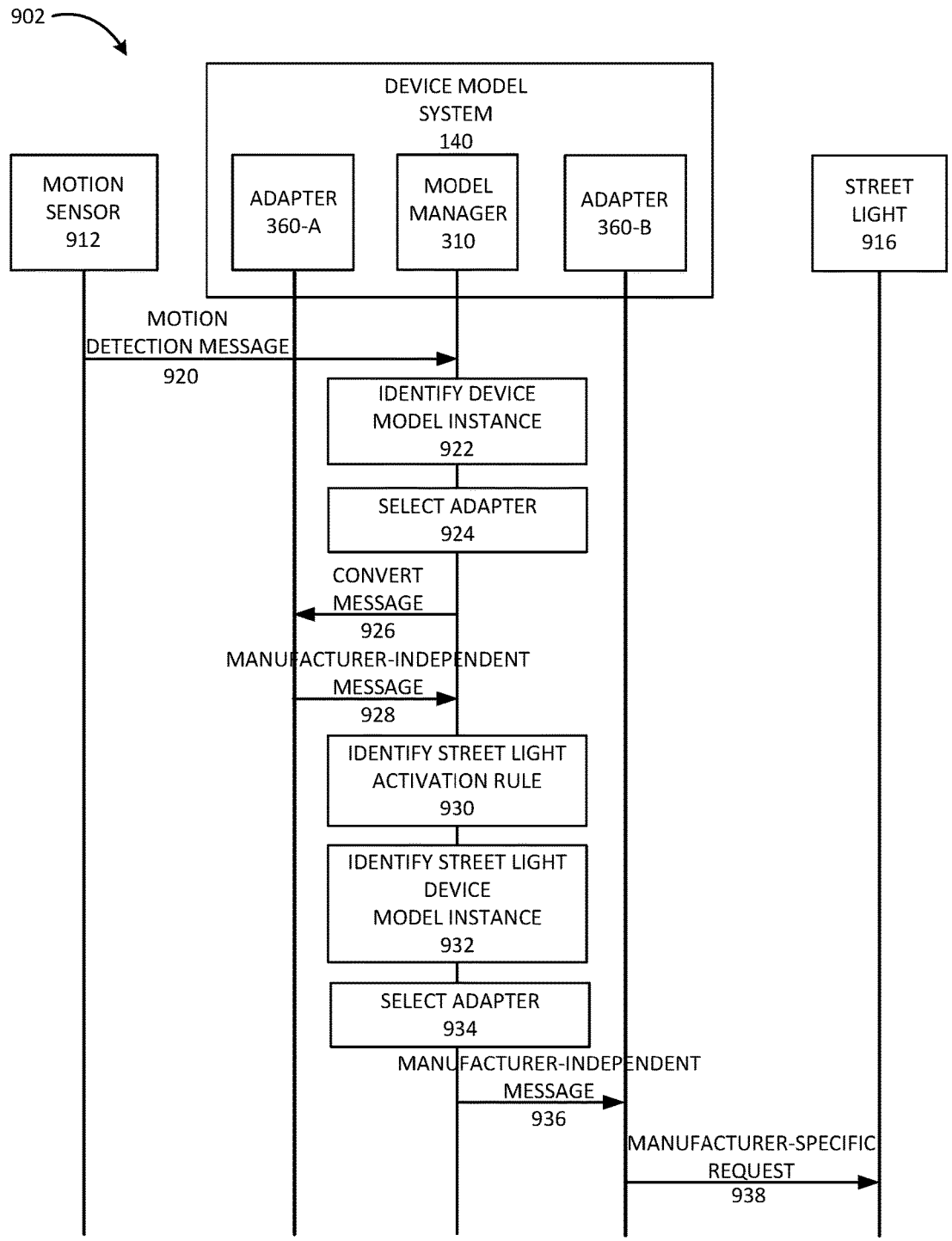
FIG. 9B is a diagram of an exemplary signal flow associated with the system of FIG. 9A.

FIG. 9B is a diagram of an exemplary signal flow 902 associated with system 901. As shown in FIG. 9B, motion sensor 912 may detect vehicle 910 and may send a motion detection message 920 to device model system 140. Model manager 310 may identify a device model instance for motion sensor 912 (block 922), may select adapter 360-A as being associated with the identified device model instance (block 924), and may instruct adapter 360-A to convert the received message to a manufacturer-independent message (signal 926). Adapter 360-A may generate the manufacturer-independent message based on the received motion detection message and may provide the manufacturer-independent message to model manager 310 (signal 928). Model manager 310 may then identify a street light activation rule associated with the identified device model instance (block 930), may identify one or more street light device model instances based on the street activation rule (block 932), and may select one or more adapters 360 associated with the identified street light device model instances (block 934). Device manager 310 may then generate a manufacturer-independent message based on the identified rule and based on the received motion detection message and may instruct adapter 360-B to convert the manufacturer-independent message to a manufacturer-specific message (signal 936). Adapter 360-B may generate the manufacturer-specific and may provide the manufacturer-specific message to street light 916 (signal 938). In response, street light 916 may light up for a particular length of time, illuminating the road for vehicle 910.

Another example implementation may include a smart grid. A smart grid may include smart meters, customer network devices configured to report power outages, power distribution devices, dispatch centers, and/or other types of devices. As an example, smart meter may report a power outage and a dispatch center may be alerted to dispatch a technician vehicle to the area of the power outage. The smart meter may be associated with a first device model instance and the dispatch center may be associated with a second device model instance in device model system 140 and device model system 140 may associate a rule with the first device model instance to alert the second device model instance when a power outage message is received from the smart meter. As another example, the smart meter may report a power outage and a power distribution center may re-distribute power around a failure point.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 5, 6, and 7, and series of signal flows have been described with respect to FIGS. 8F and 9B, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
   receiving, by the computer device via a network from an application running on a user device, a manufacturer-independent request intended for a target device, wherein the manufacturer-independent request includes an instruction for the target device to perform an action, and wherein the instruction is in a protocol or format associated with a virtual device model;
   identifying, by the computer device, a virtual device model instance associated with the target device;
   identifying, by the computer device, a virtual device model associated with the identified virtual device model instance;
   selecting, by the computer device, a manufacturer adapter based on the identified virtual device model instance and the identified virtual device model;
   converting, by the computer device, the manufacturer-independent request to a manufacturer-specific request for the target device using the selected manufacturer adapter, wherein the manufacturer-specific request includes the instruction for the target device to perform the action in a protocol or format associated with a manufacturer's implementation of the target device, and wherein converting the manufacturer-independent request to the manufacturer-specific request for the target device hides a manufacturer's implementation of the target device from the application running on the user device; and
   sending, by the computer device and via the network, the manufacturer-specific request to the target device to perform the action.

2. The method of claim 1, wherein receiving the manufacturer-independent request intended for the target device includes:
   providing an Application Programming Interface (API), for generating and accessing virtual device models, to the user device; and
   receiving the manufacturer-independent request via the provided API.

3. The method of claim 2, further comprising providing a wrapper for the API, wherein the wrapper enables a particular operating system to interface with the API.

4. The method of claim 1, wherein converting the manufacturer-independent request to the manufacturer-specific request for the target device using the selected manufacturer adapter includes:
   identifying a first set of attribute-value pairs associated with the manufacturer-independent request;
   identifying a second set of attribute-value pairs associated with the manufacturer-specific request; and
   mapping the first set of attribute-value pairs to the second set of attribute-value pairs.

5. The method of claim 4, further comprising:
   determining that a particular one of the second set of attribute-value pairs has not been provided with a value as a result of the mapping; and
   generating a default value for the particular one of the second set of attribute-value pairs.

6. The method of claim 4, wherein mapping the first set of attribute-value pairs to the second set of attribute-value pairs includes:
   selecting a particular one of the first set of attribute-value pairs;
   executing a conversion function to convert a first value from the particular one of the first set of attribute-value pairs into a second value; and
   generating a particular one of the second set of attribute-value pairs, associated with the particular one of the first set of attribute-value pairs, wherein the particular one of the second set of attribute-value pairs includes the second value.

7. The method of claim 1, further comprising:
   receiving a manufacturer-specific message from a source device;
   identifying a source device virtual device model instance associated with the source device;
   identifying a source device adapter associated with the source device virtual device model instance;
   generating a manufacturer-independent message using the identified source device adapter based on the received manufacturer-specific message;
   determining a target device for the manufacturer-independent message; and
   providing the manufacturer-independent message to the determined target device.

8. The method of claim 7, further comprising:
   determining that a rule is associated with the identified source device virtual device model instance; and
   executing the rule in response to generating the manufacturer-independent message.

9. The method of claim 1, further comprising:
   receiving a request to generate a new virtual device model instance for another target device;
   identifying a device type associated with the other target device;
   determining whether the identified device type is associated with an existing virtual device model; and generating the new virtual device model instance based on the existing virtual device model, when the identified device type is associated with an existing virtual device model.

10. The method of claim 9, further comprising:
determining that the identified device type is associated with another device type;
identifying the existing virtual device model associated with the other device type; and
deriving a new virtual device model from the existing virtual device model using inheritance.

11. The method of claim 9, further comprising:
determining whether a compatible manufacturer adapter exists for the new virtual device model instance;
associating the compatible manufacturer adapter with the new virtual device model instance, when the compatible manufacturer adapter exists; and
generating a new manufacturer adapter for the new virtual device model instance, when the compatible manufacturer adapter does not exist.

12. A computer device comprising:
logic configured to:
receive, from an application running on a user device via a network, a manufacturer-independent request intended for a target device, wherein the manufacturer-independent request includes an instruction for the target device to perform an action, and wherein the instruction is in a protocol or format associated with a virtual device model;
identify a virtual device model instance associated with the target device;
identify a virtual device model associated with the identified virtual device model instance;
select a manufacturer adapter based on the identified virtual device model instance and the identified virtual device model;
convert the manufacturer-independent request to a manufacturer-specific request for the target device using the selected manufacturer adapter, wherein the manufacturer-specific request includes the instruction for the target device to perform the action in a protocol or format associated with a manufacturer's implementation of the target device, and wherein converting the manufacturer-independent request to the manufacturer-specific request for the target device hides a manufacturer's implementation of the target device from the application running on the user device; and
send, via the network, the manufacturer-specific request to the target device to perform the action.

13. The computer device of claim 12, wherein, when receiving the manufacturer-independent request intended for the target device, the logic is further configured to:
provide an Application Programming Interface (API), for generating and accessing virtual device models, to the user device; and
receive the manufacturer-independent request via the provided API.

14. The computer device of claim 12, wherein, when converting the manufacturer-independent request to the manufacturer-specific request for the target device using the selected manufacturer adapter, the logic is further configured to:
identify a first set of attribute-value pairs associated with the manufacturer-independent request;
identify a second set of attribute-value pairs associated with the manufacturer-specific request; and map the first set of attribute-value pairs to the second set of attribute-value pairs.

15. The computer device of claim 14, wherein the logic is further configured to:
determine that a particular one of the second set of attribute-value pairs has not been provided with a value as a result of the mapping; and
generate a default value for the particular one of the second set of attribute-value pairs.

16. The computer device of claim 15, wherein, when mapping the first set of attribute-value pairs to the second set of attribute-value pairs, the logic is further configured to:
select a particular one of the first set of attribute-value pairs;
execute a conversion function to convert a first value from the particular one of the first set of attribute-value pairs into a second value; and
generate a particular one of the second set of attribute-value pairs, associated with the particular one of the first set of attribute-value pairs, wherein the particular one of the second set of attribute-value pairs includes the second value.

17. The computer device of claim 12, wherein the logic is further configured to:
receive a request to generate a new virtual device model instance for another target device;
identify a device type associated with the other target device;
determine whether the identified device type is associated with an existing virtual device model; and
generate the new virtual device model instance based on the existing virtual device model, when the identified device type is associated with an existing virtual device model.

18. The computer device of claim 17, wherein the logic is further configured to:
determine that the identified device type is associated with another device type;
identify the existing virtual device model associated with the other device type; and
derive a new virtual device model from the existing virtual device model using inheritance.

19. The computer device of claim 18, wherein the logic is further configured to:
determine whether a compatible manufacturer adapter exists for the new virtual device model instance;
associate the compatible manufacturer adapter with the new virtual device model instance, when the compatible manufacturer adapter exists; and
generate a new manufacturer adapter for the new virtual device model instance, when the compatible manufacturer adapter does not exist.

20. A non-transitory memory device, storing instructions executable by a processor, the non-transitory memory device comprising:
one or more instructions to receive via a network, from an application running on a user device, a manufacturer-independent request intended for a target device, wherein the manufacturer-independent request includes an instruction for the target device to perform an action, and wherein the instruction is in a protocol or format associated with a virtual device model;
one or more instructions to identify a virtual device model instance associated with the target device;
one or more instructions to identify a virtual device model associated with the identified virtual device model instance;

one or more instructions to select a manufacturer adapter based on the identified virtual device model instance and the identified virtual device model;

one or more instructions to convert the manufacturer-independent request to a manufacturer-specific request for the target device using the selected manufacturer adapter, wherein the manufacturer-specific request includes the instruction for the target device to perform the action in a protocol or format associated with a manufacturer's implementation of the target device, and wherein converting the manufacturer-independent request to the manufacturer-specific request for the target device hides a manufacturer's implementation of the target device from the application running on the user device; and one or more instructions to send, via the network, the manufacturer-specific request to the target device to perform the action.

* * * * *